(12) United States Patent
Iannone et al.

(10) Patent No.: US 12,191,913 B2
(45) Date of Patent: Jan. 7, 2025

(54) OPTICAL TRANSMITTER FOR PASSIVE OPTICAL NETWORKS

(71) Applicant: Nokia Solutions and Networks Oy, Espoo (FI)

(72) Inventors: Patrick Iannone, Aberdeen, NJ (US); Roland Ryf, Aberdeen, NJ (US); Rene-Jean Essiambre, Red Bank, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 281 days.

(21) Appl. No.: 17/709,975

(22) Filed: Mar. 31, 2022

(65) Prior Publication Data
US 2023/0318714 A1 Oct. 5, 2023

(51) Int. Cl.
*H04B 10/548* (2013.01)

(52) U.S. Cl.
CPC ................................. *H04B 10/548* (2013.01)

(58) Field of Classification Search
None
See application file for complete search history.

(56) References Cited

U.S. PATENT DOCUMENTS

| | | | | |
|---|---|---|---|---|
| 5,812,297 A | * | 9/1998 | Mussino | H04B 10/58 398/198 |
| 11,005,569 B1 | * | 5/2021 | Cho | H04B 10/541 |
| 2021/0006439 A1 | * | 1/2021 | Li | H04L 25/4917 |

OTHER PUBLICATIONS

Huiwen Yin et al, "DLI-Based DP-QPSK Reception Scheme for Short-Range Optical Communication" MDPI applied sciences article, Appl. Sci. 2020, 10, 4815; www.mdp1.com/journal/applsci, pp. 1-12, Jul. 13, 2020.

D.O. Caplan et al., "High-sensitivity, multi-channel single-iterferometer DPSK receiver", Optical Express 10984, vol. 14, No. 23, Nov. 13, 2006.

E.A. Swanson, J.C. Livas, and R.S. Bondurant, "High Sensitivity Optically Preamplified Direct Detection DPSK Receiver with Active Delay-Line Stabilization," IEEE Photon. Technol. Lett., vol. 6, No. 2, 1994.

* cited by examiner

*Primary Examiner* — David W Lambert
(74) *Attorney, Agent, or Firm* — Stratford Group Ltd.

(57) ABSTRACT

An apparatus includes an optical PSK transmitter configured to output carrier-suppressed optical signal phase-modulated according to a M-PSK constellation without substantial amplitude modulation. The apparatus includes an optical phase modulator, a driver configured to drive the modulator with a PAM-N electrical signal, N>M, and a signal encoder configured to map an input bit stream to the PAM-N electrical signal.

20 Claims, 6 Drawing Sheets

OPTICAL TRANSMITTER FOR PASSIVE OPTICAL NETWORKS

TECHNICAL FIELD

The present invention generally relates to optical communication systems, and more particularly relates to optical transmitters for passive optical networks.

BACKGROUND

Operators of optical communication systems, such as but not exclusively passive optical networks (PONs), may face the need to upgrade their network to greater transmission rates. Due to the relatively high cost of improvements to the outside fiber plant, network operators may prefer to upgrade PON data rates by replacing terminal equipment only, e.g. optical line terminals (OLTs) and optical network units (ONUs) while leaving the outside fiber plant, and therefore the optical loss budgets, unchanged. The "loss budget" is the maximum permissible optical loss between the OLT, typically housed in a central office (CO), and the ONUs, typically housed at user locations. Since the fiber plant is unchanged, the loss budget typically remains fixed during an upgrade to higher data rates.

SUMMARY

Higher data rates may require a greater transmitter launch power into fiber links, so that optical energy per bit remains above noise at the receiver end of the link, e.g. at the ONU. Thus, some embodiment increase the downstream PON data rate with optical transmitters that can operate at higher rates and at higher in-fiber optical power levels over the same loss budget as the previous PON generation's lower rate transceivers. Such a transmitter launch power is typically limited by optical non-linear effects in the optical fiber, such as self-phase modulation (SPM), which is typically optical intensity variations.

Embodiments described herein may enable PON data transmission using optical signals that are substantially absent of intensity modulation, which may allow increasing the optical launch power into an optical fiber link beyond the SPM limit, and in turn facilitating a further increase in per-wavelength data transmission rates for PONs with fixed loss budgets.

An aspect of the present disclosure relates to an apparatus comprising an optical transmitter for transmitting an optical carrier modulated according to an M-symbol phase shift keying (M-PSK) modulation format, M≥2. The optical transmitter comprises an optical phase modulator (OPM), a driver for driving the OPM with a PAM-N electrical signal, where N is an integer greater than M, and a signal processor for mapping an input bit stream to the PAM-N electrical signal.

An aspect of the present disclosure relates to an apparatus comprising: an optical transmitter for transmitting an optical carrier modulated according to an M-symbol phase shift keying (M-PSK) modulation format, M≥2, the optical transmitter comprising: an optical phase modulator (OPM); a driver for driving the OPM with an electrical driver signal; and a signal processor for mapping an input bit stream to levels of a PAM-N constellation, where N is an integer greater than M, such that each of the levels causes the driver to produce a corresponding electrical driver signal.

In at least some implementations, the optical transmitter may be configured to optically data modulate the optical carrier to carry phase shifts that vary between N values spaced apart by about $2\pi/M$ radian. The signal processor may be configured to cause the electrical driver signal to vary between N different levels.

In at least some implementations, the optical transmitter may be configured to modulate the optical carrier in power with a modulation depth smaller than 20%.

In some implementations M=4 and N=6. In some implementations M=2 and N=3.

In at least some implementations, the signal processor is configured to map different instances of an input digital value, in the input bit stream, to two different signal levels of the PAM-N constellation. The two different signal levels may correspond to the same phase shift of the optical carrier modulo $2\pi$. In at least some implementations, the signal processor is configured to map the different instances of the first of the symbols to either one of the two different signal levels in an alternating fashion. In at least some implementations, the signal processor is configured so that transitions to the two different signal levels from another one of the N signal levels in the PAM-N electrical signal occur with substantially equal frequency. In at least some implementations, the signal processor is configured to use a pseudorandom selection rule to select between the two different signal levels. In at least some implementations, the signal processor is configured to map different occurrences in the input bit stream of a first of the symbols to two of the signal levels with substantially equal probability, and to map different occurrences in the input bit stream of a second of the symbols to two different of signal levels with substantially equal probability. In at least some implementations, the two of the signal levels correspond to the OPM causing optical phase shifts differing by substantially $2\pi$ radian on the optical carrier.

In at least some implementations, the signal processor is configured to cooperate with the driver and the OPM such that at least some transitions from the first of the symbols to a second of the symbols and inverses thereof cause the optical phase of the carrier to vary by substantially $2\pi$ radian.

An aspect of the present disclosure provides an apparatus comprising: an optical QPSK transmitter for transmitting an optical carrier modulated according to a QPSK modulation format. The optical QPSK transmitter comprises: an optical phase shifter (OPS); a driver for driving the OPS with a PAM-6 electrical signal to cause an optical phase shift to the optical carrier that alternates between six different phase levels spaced substantially by $\pi/2$ radian, the six different phase levels comprising two pairs of $2\pi$ spaced phase levels; and a signal processor for processing an input bit stream to map consecutive 2-bit sequences therein to symbols of a QPSK constellation, so that a first and a second of the symbols are each mapped to both phase levels of a corresponding pair of the $2\pi$ spaced phase levels. The signal processor may be configured so that transitions from a third of the symbols to the first of the symbols in the input bit stream are represented by transitions to different phase levels of a first of the two pairs, and transitions from the third of the symbols to the second of the symbols in the input bit stream are represented by transitions to different phase levels of a second of the two pairs. In at least some implementations, the signal processor is configured so that transitions to different phase levels of the first or the second of the two pairs happen with a substantially same frequency.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION

Figure 1:
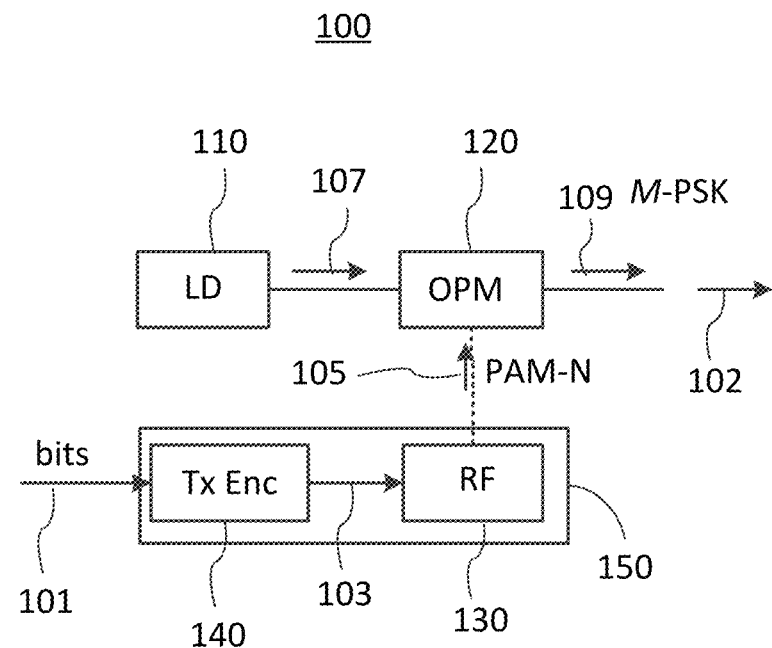
FIG. 1 is a schematic block diagram of an example optical M-PSK transmitter according to an embodiment.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated. The term "connected" may encompass direct connections or indirect connections through intermediate elements, unless explicitly stated otherwise. The term "electrically connected" and its derivatives encompasses both DC (direct-current) and AC (alternating current) connections, unless explicitly stated otherwise.

Furthermore, the following abbreviations and acronyms may be used in the present document:

"Si" Silicon
"LiNbO3" Lithium Niobate
"SOI" Silicon on Insulator
"SiP" Silicon Photonics
"RF" Radio Frequency
"DC" Direct Current
"AC" Alternate Current
"PAM" Pulse Amplitude Modulation
"NRZ" Non-Return to Zero
"PAM-N" Pulse Amplitude Modulation with N amplitude levels
"PSK" Phase Shift Keying
"M-PSK" PSK with an M-symbol constellation
"QPSK" Quadrature Phase Shift Keying
"BPSK" Binary Phase Shift Keying Embodiments described below relate to optical transmitters that generate phase-modulated signals that are nearly absent of amplitude modulation (AM), or have only a relatively shallow AM, at a target modulation rate and its first subharmonic. At least some of the embodiments relate to optical PSK transmitters, modulators, and modulation methods for generating carrier-suppressed optical PSK signals that may be less susceptible to non-linear signal degradation in the optical fiber, such as e.g. signal degradation caused by Brillouin scattering and SPM.

An aspect of the present disclosure provides an optical transmitter for transmitting an optical carrier modulated according to an M-symbol phase shift keying (M-PSK) modulation format, M≥2, the optical transmitter comprising: an optical phase modulator (OPM); a driver for driving the OPM with a PAM-N electrical driver signal, where N is an integer greater than M; and a signal processor for mapping an input bit stream to the PAM-N electrical signal. In at least some implementations, applying the PAM-N electrical signal to the OPM induces an optical phase shift to the optical carrier that alternates between N different phase shift values spaced substantially by 2π/M radian. In some example implementations M=4 and N=6. In some other example implementations M=2 and N=3.

The signal processor may cooperate with the driver to cause the PAM-N electrical driver signal to alternate between N signal levels, each of the N signal levels being different from any other of the N signal levels, the N signal levels corresponding to the N different phase shift values. In at least some implementations, driving the OPM with the PAM-N electrical driver signal causes the optical carrier to be modulated in power with a modulation depth smaller than 20%.

The signal processor may be configured to identify, in the input bit stream, binary symbols of an M-PSK constellation, and to map different instances, in the input bit stream, of a first of the symbols to two different signal levels from the N signal levels. The two different signal levels may correspond to two of the N different phase shift values that are equal modulo 2π radian. The signal processor may be configured to map the different instances of the first of the symbols to either one of the two different signal levels in alternating fashion so as to provide at least partial carrier suppression in an output optical spectrum of the OPM. In some implementations, the signal processor may be configured so that transitions to the two different signal levels from another one of the N signal levels in the PAM-N electrical signal occur with substantially equal frequency. In some implementations, the signal processor may be configured to use a random or pseudorandom selection rule to select between the two different signal levels.

In some implementations, the signal processor may be configured to map different occurrences in the input bit stream of a first of the symbols to first two signal levels with substantially equal probability, and to map different occurrences in the input bit stream of a second of the symbols to second two signal levels with substantially equal probability, wherein the first two signal levels and the second two signal levels are four different ones of the N signal levels. The first two signal levels may correspond to OPM-induced optical phase shifts separated by substantially 2π radian, and the second two signal levels may correspond to OPM-induced optical phase shifts separated by substantially 2π radian.

In some implementations, the signal processor is configured to cooperate with the driver and the OPM so that at least some transitions to and forth between the first of the symbols and a second of the symbols in the input bit stream cause the optical phase of the carrier to vary by substantially 2π radian.

An aspect of the present disclosure provides and apparatus comprising an optical QPSK transmitter for transmitting an optical carrier modulated according to a QPSK modulation format, the optical QPSK transmitter comprising: an optical phase shifter (OPS); a driver for driving the OPS with a PAM-6 electrical signal to cause an optical phase shift to the optical carrier that alternates between six different phase levels spaced substantially by π/2 radian, the six different phase levels comprising two pairs of 2π spaced phase levels; and a signal processor for processing an input bit stream to map consecutive 2-bit sequences therein to symbols of a QPSK constellation, so that a first and a second of the symbols are each mapped to both phase levels of a corresponding pair of the 2π spaced phase levels. The signal processor may be configured so that transitions from a third of the symbols to the first of the symbols in the input bit stream are represented by transitions to different phase levels of a first of the two pairs, and transitions from the third of the symbols to the second of the symbols in the input bit stream are represented by transitions to different phase levels of a second of the two pairs. In some implementations the signal processor is configured so that transitions to different phase levels of the first or the second of the two pairs happen with a substantially same frequency.

Figure 5:
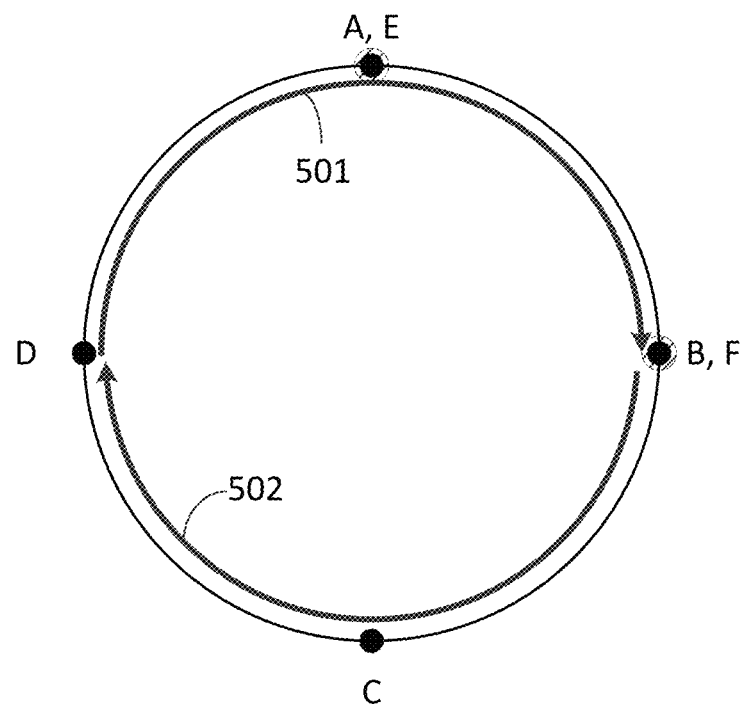
FIG. 5 is diagram illustrating an extended QPSK constellation including two phase-degenerate symbols with a 2π spacing for different PAM-6 drive values, which may be used in an example the optical transceiver of FIG. 1.

FIG. 1 illustrates an example optical PSK transmitter 100 configured for transmitting a PSK modulated optical signal 102. The PSK modulated optical signal 102 may be in the form of an optical carrier 107 having an optical phase modulated with an M-symbol PSK (M-PSK) signal 109, e.g., a purely phase modulated optical carrier. The optical carrier 107 may be provided by an optical source 110, such as suitable semiconductor laser, e.g. a wavelength-stabilized laser diode (LD). The M-PSK signal 109 may be in the form of a sequence of symbols $S_m$, m=1, . . . , M, selected from an M-symbol PSK constellation, where M is an integer greater than or equal to 2, with each symbol transmitted in sequence in a corresponding time slot. In embodiments with $M=2^k$, k≥1, each symbol $S_m$ corresponds to a binary sequence of k bits. Each of the symbols $S_m$ is encoded as an optical phase shift on the optical carrier 107, so that different symbols $S_m$ are encoded by different optical phase shifts, modulo 2π. An ideal M-symbol M-PSK constellation may be represented as M points equidistantly spread on a circle in a 2D phase plane, with the radius of the circle representing the amplitude of the optical field and the position on the circle representing the optical phase shift, e.g. as illustrated below in FIGS. 3A and 5 for M=4 (QPSK).

Transmitter 100 includes an optical phase modulator (OPM) 120, an electrical circuit 150 configured to convert an input bit stream 101 to a PAM-N electrical modulation signal 105 driving the OPM 120. The electrical circuit 150 may include a driver 130 for generating the PAM-N electrical modulation signal 105, and a signal processor 140 communicatively connected to the driver 130 and configured for mapping the input bit stream 101 to the PAM-N electrical signal 105. The signal processor 140 may be configured to convert the input bit stream 101 into a control signal(s) 103, either digital or analog, with the driver 130 in turn converting the control signal 103 into the PAM-N electrical modulation driver signal 105. The signal processor 140 may also be referred to herein as the encoder 140, and may be embodied using any suitably configured, e.g. programmed, digital processor, programmable logic circuit, or the like, that is capable of operating at a desired line rate; one skilled in the art will be able to select suitable digital hardware and/or software to implement the encoder 140 having the benefit of the present disclosure.

Figure 2:
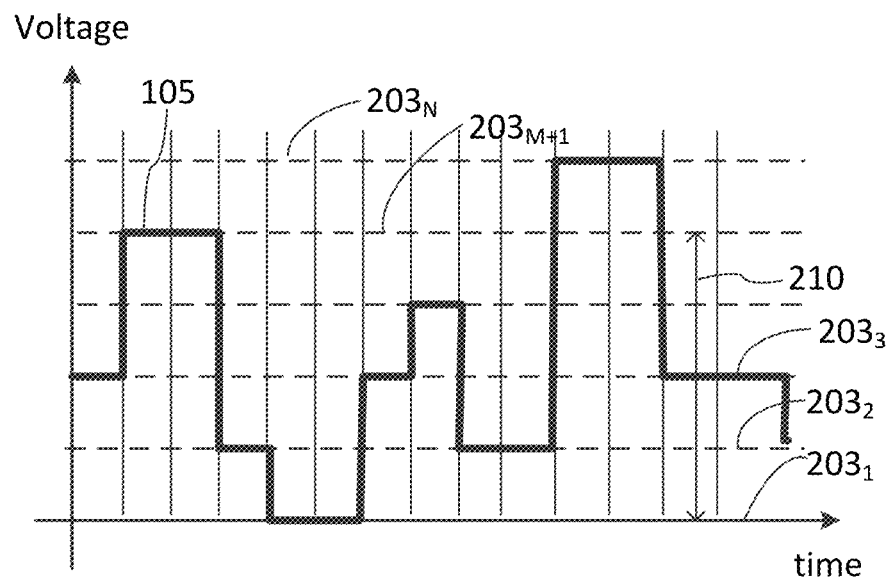
FIG. 2 is an example PAM-N signal for driving an optical phase modulator of the optical M-PSK transmitter of FIG. 1.

In operation, the encoder 140 may parse the input bit stream 101 into bit sequences that are binary representations of symbols $S_m$, and to map the corresponding bit sequences in the input bit stream 101 to levels 211 in the PAM-N signal 105. The PAM-N electrical modulation driver signal 105, an example of which is illustrated in FIG. 2 for N=6, may be e.g. an NRZ pulse signal which amplitude varies between N different modulation levels, e.g. $203_1$-$203_N$ in FIG. 2, N being an integer that is greater than M. The electrical modulation driver levels $203_1$-$203_N$ may be collectively referred to herein as modulation driver-signal levels 203, signal levels 203, or simply driver levels 203. In some embodiments, signal transitions between adjacent ones of the levels 203 may correspond to an optical phase shift in the output modulated optical signal 102 of substantially 2π/M. Here, substantially means up to the accuracy of the circuit elements and devices used, preferably within +\−10%. Accordingly, if N<2M, (N−M) of the symbols $S_m$ may be mapped to two of the modulation levels 203. In the context of this specification, a symbol $S_m$ that may be mapped to two or more of the modulation driver levels 203, and thus represented in the output optical signal 102 by effectively the same optical phase shifts, modulo 2π. Here, any pair of phase shifts spaced apart by 2π or an integral multiple thereof, may be referred to as degenerate and correspond to the same PSK optical symbol.

Figure 3A:
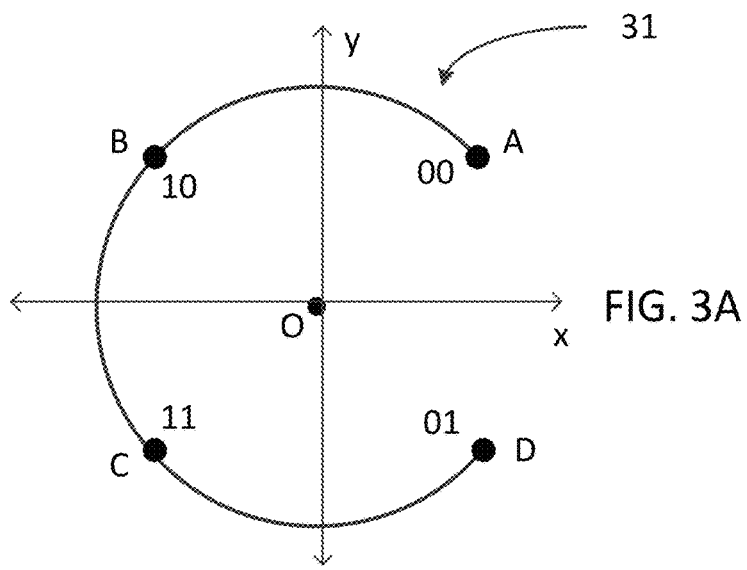
FIG. 3A is a schematic diagram of a QPSK symbol constellation in a 2D plane, illustrating inter-symbol transitions driven by a PAM-4 signal.
Figure 3B:
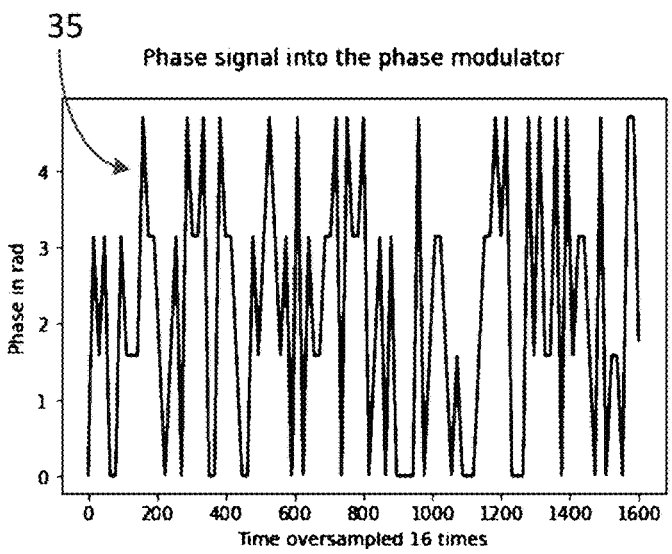
FIG. 3B is a plot showing an example PAM-4 signal for driving a QPSK modulator.
Figure 3C:
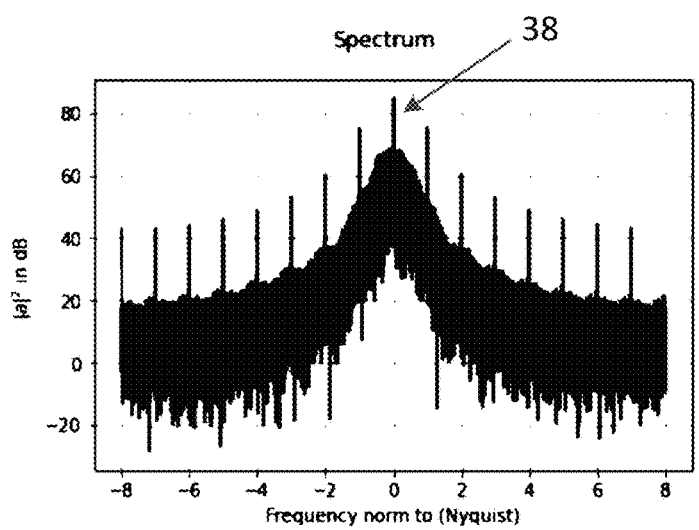
FIG. 3C is an example optical spectrum of light modulated with the PAM-4 signal shown in FIG. 3B.

Possible benefits of encoding one or more selected symbols $S_m$ with two or more phase-degenerate modulation driver signal levels may be understood by considering e.g., a conventional QPSK modulator that maps four two-bit symbols $S_m$, m=1, . . . , 4, to four optical phase shifts separated by π/2 rad, e.g. as follows: $S_1$=00, $S_2$=10, $S_3$=11, and $S_4$=01. FIG. 3A illustrates this QPSK constellation, where the four symbols are denoted as A, B, C, and D, respectively. In this representation, all symbols lie on a circle 31 in a 2D plane having its center at an origin "O", with their polar coordinate pairs representing the optical amplitude, which is constant along the circle, and the optical phase. A QPSK modulated optical signal may be conventionally generated by driving the OPM with a PAM-4 electrical signal, e.g. signal 35 illustrated in FIG. 3B, which alternates between M=4 signal level (e.g. voltages applied to the OPM 120; in FIG. 3B, these four levels are represented by corresponding OPM-induced optical phase shifts). The four modulation levels are selected to induce four optical phase shifts spaced by $\pi/2$, as represented by the four symbols A to D in FIG. 3A and seen along the y-axis in FIG. 3B. The arcs connecting the four symbols in FIG. 3A illustrate the transitions caused by the PAM-4 modulation signal 35; e.g. when the input bit stream 101 includes a bit sequence 1000 or 0010, including a transition between symbols A to B, the OPM 120 is driven to modulate the optical carrier to move along the arc AB, e.g. from A to B or from B to A. When the input bit stream 101 includes a bit sequence 0001 or 0100, including a transition between symbols A and D, the OPM 120 is driven to modulate the optical carrier to move along the long arc ABCD in either direction. The circle in FIG. 3A is broken, illustrating the absence of transitions to and forth between any two symbols accruing $2\pi$. This results in a PSK modulated signal that is not DC-balanced, resulting in an optical spectrum (FIG. 3C) having a strong carrier line 38, as indicated in FIG. 3C. The presence of the strong carrier can lead to a Brillouin scattering penalty and/or impose an SPM limit upon an optical power that may be launched in an optical fiber link of a communication system, such as e.g. a PON.

The inventors believe that, by using a PAM-N modulation signal with N>M and the driver level spacing corresponding to the $2\pi/M$ phase shift, and by suitably mapping different binary M-PSK symbols in the input bit stream to levels of the PAM-N modulation driver signal so that at least one of the symbols (termed e.g. "first symbol") is represented by two degenerate levels of the PAM-N modulation signal, the carrier-frequency peak in the output optical spectrum may be at least partially suppressed. In example embodiments described below the mapping is such that at least some of the transitions between the first symbol and a second symbol, to and back, combine to accrue a $2\pi$ phase shift of the optical carrier, i.e. close the circle 31 in the phase plane. We note that to contribute to the carrier suppression, the transitions between two symbols that move the phase angle over the entire circle do not have to immediately follow one another. A typical input bit stream is expected to have about equal number of to- and back transitions between any two symbols, thereby enabling symbol-to-level mapping rules that substantially reduces the contribution of these transitions into the carrier line in the output optical spectrum. By representing each of one or more constellation symbols $S_m$ with two or more "degenerate" phase states that are spaced by $2\pi$, or an integer multiple thereof, and using suitable transition selection rules to select between the phase-degenerate levels to transmit different instances of a corresponding symbol, the transition circle 31 may be closed in a way that the resulting PSK modulated optical signal 102 is substantially DC-balanced at the carrier frequency when averaged over a sufficiently large number of symbol intervals, so that the carrier line in an optical spectrum of the signal is suppressed.

In example embodiments with N>M, the encoder 140 may map the same symbol $S_m$ in different places of the input bit stream 101 to different "degenerate" driver levels 211, i.e., different PAM-N signals 105, thereby coding to the same optical symbol $S_m$. For example, $S_1$, may be represented by the two different PAM-N signals 105, e.g., by two different modulation driver levels 203, e.g. $203_1$ and $203_{M+1}$. The symbol $S_1$ may be referred to as the first symbol for convenience of the description. The spacing between two "degenerate" modulation driver signal levels $203_1$ and $203_{M+1}$, i.e. the difference in their magnitude, may correspond to an optical phase shift of the carrier wave 107 by, substantially, $2\pi$, i.e., representing the same optical PSK symbol. The presence of such pairs of modulation driver signal levels corresponding to the same optical PSK symbol may enable a mapping of the input data stream to a modulated optical carrier having a reduced or vanishing carrier component in the output optical spectrum.

Typically, all input data symbols $S_m$ are expected to appear in the input bit stream 101 with about equal frequency. The encoder 140 may be configured to map at least some of different occurrences of the first symbol $S_1$ in the input bit stream 101 to different ones of two phase-degenerate driver levels, such as the levels $203_1$ and $203_{M+1}$ of FIG. 2. That is, the encoder 140 may be configured to map some occurrences of $S_1$ in the input bit stream 101 to the modulation level $203_1$, and some other occurrences of $S_1$ in the input bit stream 101 to the modulation level $203_{M+1}$. Rules for selecting between transitions to phase-degenerate signal levels, such as e.g. $203_1$ and $203_{M+1}$, may be chosen so as to provide a desired degree of carrier suppression in the PSK-modulated optical signal 102.

In some embodiments the encoder 140 may read the input bit stream 101, map each subsequent symbol $S_m$ to one of the signal levels 203, and, upon an encounter of the first symbol $S_1$, map said symbol to either one of the two signal levels $203_1$ and $203_{M+1}$ in accordance with a pre-defined rule, e.g. depending on a current state of the encoder (i.e. current signal level of the PAM-N signal 105). The mapping may be done so that transitions to the first symbol $S_1$ from at least one other symbol, e.g. some second symbol $S_2$ corresponding to a second signal level $203_i$, $1<i\leq M$, are mapped to transitions in signal 105 from $203_i$, to either one of the two phase-degenerate signal levels $203_1$ and $203_{M+1}$ with approximately equal frequency. The mapping may also be done consistent with a maximum limitation on the magnitude of the PAM-N symbol, e.g., due to the limited voltage range of the electronic driver.

For example, in some embodiments the mapping may be done so that in a random input bit stream of 1000 bits where "1" and "0" appear in about equal numbers, the number $n_1$ of $203_i$ to $203_1$ transitions may be similar to the number $n_2$ of $203_i$ to $203_{M+1}$ transitions, e.g. within +\−10%, i.e. $n_1/n_2$ is in the range 0.9-1.1. In some embodiments the mapping may be done so that in a random bit stream of 10000 bits the number of $203_i$ to $203_1$ transitions is approximately equal to the number of $203_i$ to $203_{M+1}$ transitions within +\−5%. However embodiments with a somewhat greater misbalance between the numbers of $203_i$ to $203_1$ and $203_i$ to $203_{M+1}$ transitions, e.g. with $n_1/n_2$ in the range of 0.5 to 2 in a random bit stream of 1000 or more bits, may also result in a degree of carrier suppression are within the scope of the present disclosure.

In some embodiments the encoder 140, when encountering a transition from $S_2$ to $S_1$ in the input bit stream 101, may randomly map $S_1$ to either one of the two corresponding phase-degenerate levels $203_1$ and $203_{M+1}$. In some embodiments the encoder 140 may alternate between levels $203_1$ and $203_{M+1}$ for subsequent occurrences of the first symbol $S_1$ in the input bit stream 101. In various embodiments said mappings to selected ones of the "degenerate" modulation driver values may be performed to ensure that the driver voltage remains in a limited operating range. One skilled in the art, having the benefit of the present description, will be able to design other rules for selecting between the corresponding phase-degenerate levels $203_1$ and $203_{M+1}$ for subsequent occurrences of the first symbol $S_1$.

Figure 4:
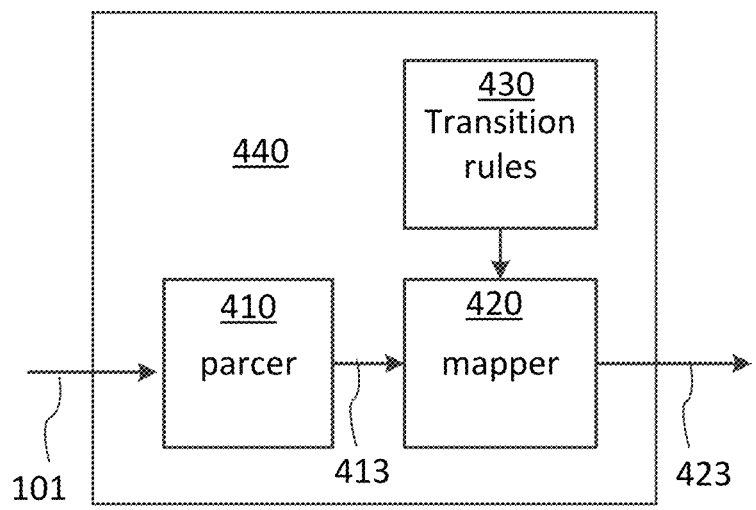
FIG. 4 is a schematic functional block diagram of one embodiment of an input symbol encoder for an optical M-PSK transmitter driven by a PAM-N signal, N>M, e.g., the optical transmitter of FIG. 1.

An example embodiment of transmitter 100 configured for carrier-suppressed QPSK transmission, i.e. M=4, will now be described with reference to FIG. 4 and Tables 1 and 2. FIG. 4 shows a schematic functional block diagram of an encoder 440, which may be an embodiment of the encoder 140 shown in FIG. 1. The encoder 440 may include an optional parser 410, a mapper 420, and memory 430 storing symbol-to-level mapping and level-to-level transition rules, as described below. The parser 410 may be configured to parse the incoming bit stream 101 into a stream 413 of symbols $S_m$, which are then passed to the mapper 420. For M-PSK modulation where $M=2^k$, where k is an integer, each symbol $S_m$ may be a sequence of k consecutive bits in the input bit stream 101. In the case of QPSK modulation, the symbols $S_m$ are 2-bit each forming a four-symbol constellation e.g. $S_1=00$, $S_2=01$, $S_3=10$, and $S_4=11$, as described above with reference to FIG. 3A. In some embodiments, the mapper 420 may be configured to identify consecutive symbols in the input bit stream 101, thereby performing the function of the parser 410.

In an example embodiment, the mapper 420 may be configured to map the symbol stream 413 to a PAM-N electrical signal 423 with N=(M+2)=6, an example of which illustrated in FIG. 2. This may include mapping each consecutive symbol $S_m$ to one of N=6 signal levels $L_i$, i=1, ..., 4 of the output PAM-6 electrical signal 423, e.g. as illustrated in FIG. 2 with reference to an example PAM-6 signal 105. The PAM-6 electrical signal 423 may then operate the RF driver 130 to apply the PAM-6 electrical modulation drive signal 105 for driving the OPM 120. This process may include e.g. converting to an analog electrical driver signal, e.g. a voltage, and suitable amplification as needed for a particular OPM to cause the desired N optical phase shifts spaced by $2\pi/M$. The mapper 420 may perform the input symbol to signal driver level mapping using a set of rules stored in memory 430. An example of such mapping rules with reference to QPSK modulation (M=4, N=6) is described below with reference to Tables 1 and 2. Example mapping rules for BPSK modulation will be subsequently described with reference to Table 3.

Table 1 illustrates an example digital-symbol-to-driver-level mapping table relating M=4 possible input 2-bit symbols $S_m$ (third column) to N=6 levels of the PAM-N electrical driver signal 103, 105, or 413 (first column, denoted as "A" to "F") and to the corresponding phase shifts induced by the OPM 120 in the optical carrier 107. As can be seen from Table 1, two of the 2-bit symbols $S_m$, "11" and "10", may be each mapped to two different levels of the PAM-6 driver signal. In the illustrated example, symbol "11" may be mapped to either signal level "A" that may correspond to a zero optical phase shift, or to signal level "E" that may correspond to a $2\pi$ optical phase shift. Similarly, symbol "10" may be mapped to either signal level "B" that may correspond to a $\pi/2$ optical phase shift, or to signal level "F" that may correspond to a $5\pi/2$ optical phase shift. Levels A and E (or F and B) may be referred to as phase-degenerate as they carry a same optical symbol and a conventional PSK detector won't differentiate between them even though the optical symbols were produced by different electrical modulation driver levels.

We note that other embodiments may be produced by adding same arbitrary constant phase shift to each phase level, and the optical symbol constellation is invariant under a rotation of $2\pi/M$, which is $\pi/2$ in the present example. In some embodiments, the input symbol-to-driver level assignment is performed by Gray-coded ordering so that subsequent output driver values only differ by one bit. But, this ordering is not a requirement for carrier suppression, and may be modified in some other embodiments.

TABLE 1

| Level | Phase shift | Symbol |
|---|---|---|
| A | 0 | 11 |
| B | $\pi/2$ | 10 |
| C | $\pi$ | 00 |
| D | $3/2\ \pi$ | 01 |
| E | $2\ \pi$ | 11 |
| F | $5/2\ \pi$ | 10 |

Accordingly, two of the four 2-bit symbols of the QPSK constellation may be each transmitted using either one of two signal levels: e.g. symbol "11" may be transmitted using either driver level "A" or driver level "E", and symbol "10" may be transmitted using either driver level "B" or driver level "F". By following suitable level-selection rules for selecting between phase-degenerate, modulation driver levels to transmit a corresponding same optical symbol, a suppression of the optical carrier in the optical spectrum of the modulated signal may be achieved. Such selection rules may cause forward and backwards transitions between two of the symbols, e.g. "01" and "10" to be represented by pairs of phase transitions summing substantially to $2\pi$. For example, referring to FIG. 5, some of the transitions "01"→"10" in the input bit stream may be mapped to cause the optical carrier phase to make a transition 501 from "D" ($3\pi/2$) to "B" ($\pi/2$), while some of the reverse transitions "10"→"01" in the input bit stream may be mapped to cause the optical carrier phase to make a transition 502 from "F" ($5/2\pi$) back to "D". Transitions 501 paired with transitions 502 close the transition circle in the 2D phase space, which may cancel their contribution into the carrier line of the output optical spectrum, thereby facilitating the suppression of the carrier.

Table 2 summarizes an example set of allowed transitions from a current signal level L(n−1), which represents a last received input symbol S(n−1), to a next signal driver level L(n) representing a subsequent input symbol S(n), according to an embodiment. This table, or a set of corresponding rules, may be stored in memory 430. Here n is a symbol counter in the symbol stream 413, L(n−1) (second column) is a current signal level set by the mapper 420 for the preceding input symbol S(n−1) (first column). The third to sixth columns of Table 2 define signal driver levels for a next, i.e. n-th input symbol S(n), in dependence on a current signal driver level and the newly received input symbol. In this example embodiment, there are four transitions that have two possible options: from signal level C, corresponding to the optical phase shift of $\pi$, to one of two phase-degenerate driver levels A or E (phase shifts 0 or $2\pi$, respectively) when a corresponding first input symbol is received, in this example "11", or a transition to one of two second phase-degenerate driver levels, B and F (phase shifts $\pi/2$ or $5\pi/2$, respectively), when a corresponding second input symbol is received, in this example "10". The other two transitions with two possible options are transitions from signal driver level D to either one of the two first phase-degenerate signal driver levels A or E in response to receiving a corresponding first symbol ("11"), or to either one of two second phase-degenerate signal driver levels B and F in response to receiving a corresponding second input symbol ("10").

TABLE 2

| S(n-1) | L(n-1) | S(n) = 00 | S(n) = 01 | S(n) = 10 | S(n) = 11 |
|---|---|---|---|---|---|
| 11 | A | C | D | B | A |
| 10 | B | C | D | B | A |
| 00 | C | C | D | B/F | A/E |
| 01 | D | C | D | B/F | A/E |
| 11 | E | C | D | F | E |
| 10 | F | C | D | F | E |

Figure 6:
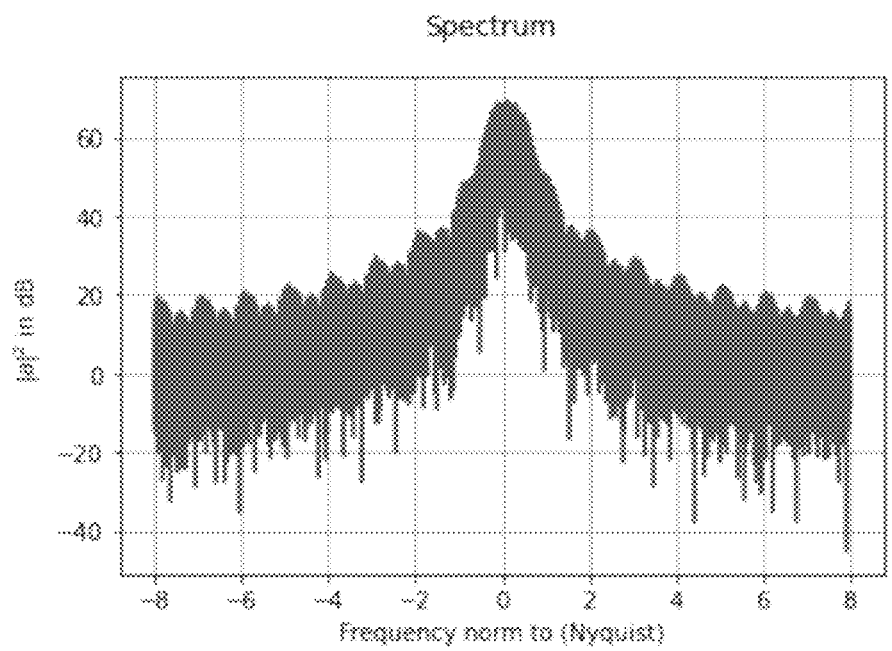
FIG. 6 is an example carrier-suppressed optical spectrum of light QPSK modulated with an example PAM-6 signal, e.g., as expected approximately for an output optical signal in some embodiments of the optical transmitter of FIG. 1.

By selecting both options in each of the multi-option transitions, with substantially equal frequency, e.g. about 50% each, the carrier line in the optical spectrum of the QPSK modulated signal 102 may be suppressed, resulting in an optical spectrum of the type illustrated in FIG. 6, or at least approaching such spectrum in terms of the carrier suppression. By way of an example, the mapper 420 may be configured so that in an input bit stream of at least 1000 bits, the number of driver level transitions C→A is within +\−10% of the number of C→E driver level transitions, and similarly for the other three multi-option driver level transitions C→B/F, D→A/E, and D→B/F. However embodiments with a greater disparity between the frequencies of transitions to different phase-degenerate levels, such as e.g. the C→A and the C→E transitions, e.g. with the corresponding frequencies differing by as much as 50%, are also within the scope of the present disclosure.

In some embodiments, the mapper 420 may select a different option every time a new driver level transition with an option occurs. In some embodiments, the mapper 420 may be configured to select between the two driver level transition options randomly or pseudo-randomly, e.g. using a suitable computer-generated random selection algorithm, at every driver level transition with an option. One skilled in the art would be able to devise other driver level transition selection rules for symbols representable by two or more signal levels to achieve suppression of the carrier having the benefit of the present disclosure.

Figure 7:
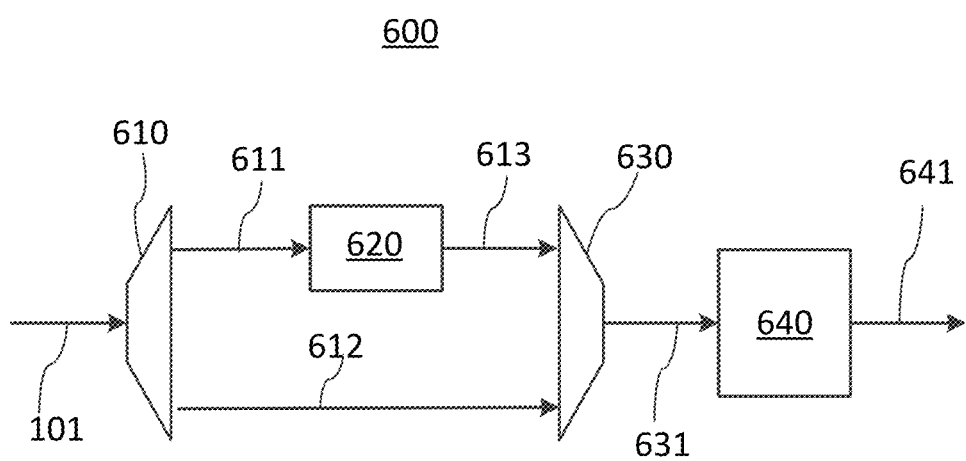
FIG. 7 is a schematic functional block diagram of an embodiment of an input symbol encoder for an optical QPSK transmitter driven by a PAM-6 signal according to FIG. 5, e.g., for use in an example of the optical transmitter of FIG. 1.

Referring to FIG. 7, there is illustrated an example encoder 600 that may be used as an embodiment of the encoder 140 to map an input bit stream to a PAM-6 driver levels for QPSK modulation, i.e., with substantial optical carrier suppression, by processing the most significant bit (MSB) and the least significant bit (LSB) of each 2-bit symbol using different rules. In this embodiment, the input bit stream 101 is parsed into a stream of 2-bit symbols by a parser 610, which is also configured to split the input bit stream 101 into a sub-stream 611 of MSBs of the 2-bit symbols and a sub-stream 612 of LSBs of the 2-bit symbols. The sub-steam 611 of MSBs is then processed using an MSB processor 620 to output a modified duo-binary stream 613 which differs from the MSB subs-stream 611 in that about 50% of MSBs having a value of "1" in are converted to "−1". By way of example, the MSB processor 620 may convert a bit sequence {0 1 1 0 0 1 1 0 1 0 1} to a sequence {0 +1 +1 0 0 −1 −1 0 +1 0 −1}. In this example, the MSB processor 620 changes the sign of some of the "1" bits in the sub-stream 611 so that all "1"s immediately following anther "1" in a sequence of "1"s have the same sign, and "1"s that are separated by one or more "0"s have opposite signs. The sub-streams 613 and 612 are then combined, e.g. by interleaving, to re-assemble into a stream 641 of symbols from the following 6-symbol library: −11, −10, 00, 01, 11, 10, where the first two symbols correspond to the 2-bit symbol sequences "11" and "10", respectively, in the input bit sequence 101. A mapper 640 may be configured to map these six symbols to the six signal driver levels of a PAM-6 signal corresponding to the six phase shifts 0, π/2, π, 3π/2, 2π, 5π/2, respectively. The symbol to driver level mapping rules implemented by the encoder 600 as described above may be equivalent to those described above with reference to the encoder 440 and Tables 1 and 2.

Table 3 illustrates an example bit to driver level mapping for a BPSK optical transmitter (M=2), in an embodiment wherein the OPM 120 is modulated with a PAM-3 modulation driver signal 105, i.e. N=3. In this embodiment, the PAM-3 electrical modulation signal 105 alternates between three signal driver levels, denoted in Table 3 as A, C, and E, which are selected to cause the OPM 10 to induce the optical carrier relative phase shifts of 0, π, and 2π, respectively, to transmit respective 1-bit symbols 1, 0, and 1. In this case, signal driver levels A and E are phase-degenerate, representing a same symbol value ("1"), and indistinguishable by an optical BPSK detector used at an optical receiver site.

TABLE 3

| Level | Phase shift | Symbol |
|---|---|---|
| A | 0 | 1 |
| C | pi | 0 |
| E | 2 pi | 1 |

Table 4 is an example transition table, which summarizes allowed driver level-to-driver level transitions in the PAM-3 driver signal carrying the input bit stream according to an embodiment. I.e. Table 4 shows, by way of example, possible transitions from a current signal driver level L(n−1), which represents a last received input symbol S(n−1), to a next signal driver level L(n) representing a subsequent input symbol S(n), according to an example embodiment. This table, or a set of corresponding rules, may be stored in memory of a transmitter encoder, e.g. memory 430 of encoder 440, to configure a corresponding optical transmitter for BPSK modulation. Here n is a bit counter in the input bit stream, L(n−1) (first column) is a current driver signal level set by the mapper 420 for the preceding input symbol S(n−1) (first column). The second and third columns of Table 4 define signal driver levels for a next, i.e. n-th input symbol S(n), in dependence on a current signal driver level and the newly received input symbol S(n). Here each input symbol S(n−1), S(n), etc., is one bit of the input bit stream. In this example embodiment, there is one transition that has two possible options: from signal driver level C, corresponding to the optical phase shift of π, to one of two phase-degenerate driver levels A or E (phase shifts 0 or 2π, respectively), both transitions representing a "01" bit sequence. The encoder of the BPSK transmitter, e.g. an embodiment of the encoder 140 or 440, may be configured to generate about equal numbers of the C→A and C→E driver level transitions in a sufficiently long segment of the PAM-3 drive signal, which should result in a carrier-suppressed BPSK modulated optical signal for an input bit stream in which "1"s and "0"s appear with about equal probability.

TABLE 4

| L(n−1) | S(n) = 0 | S(n) = 1 |
|---|---|---|
| A | C | A |
| C | C | A/E |
| E | C | E |

Figure 8:
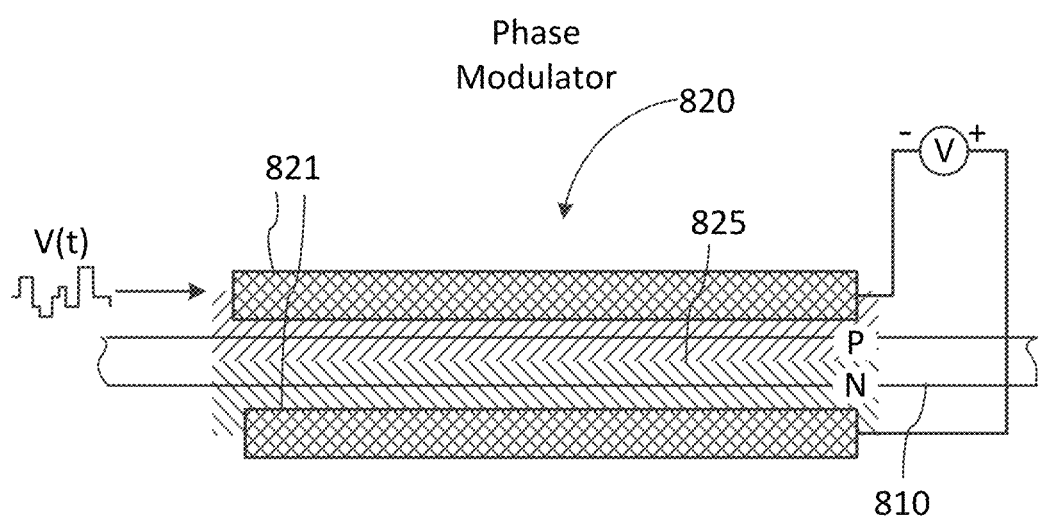
FIG. 8 is a schematic diagram illustrating an example optical phase modulator according to an embodiment.

FIG. 8 schematically shows an example optical phase shifter (OPS) 820 which may be used as the OPM 120 in embodiments of the present disclosure. In the illustrated embodiment, OPS 820 includes a segment of a semiconductor waveguide 810 with a p/n junction 825 extending along the waveguide's length, with metal electrodes 821, e.g., traveling wave radio-frequency electrodes, providing electrical contacts to the p-doped and n-doped sides of the p/n junction. Here the term p/n junction includes p/i/n junctions where the p-doped and n-doped regions are separated by an intrinsically doped semiconductor region. OPS 820 may operate e.g. in a carrier depletion mode phase modulator by applying a suitable DC bias across the electrodes 821. By modulating a voltage V between the electrodes 821 with a PAM-N voltage signal, the refractive index of the waveguide 810 between the electrodes 821 may be modulated, resulting in a suitable PSK modulation of the optical phase of light propagating through the adjacent optical waveguide without significantly modulating the optical loss in the optical waveguide, so that the light intensity varies at the PSK rate by e.g. no more than a few percent. The OPS 820 may be implemented for example in a silicon photonics chip using a SOI-based technology, or in a photonic chip using other suitable semiconducting materials, e.g., group III-V or II-Vi semiconductors.

In other embodiments, the OPM 120 may be implemented as an optical phase shifter using a planar optical waveguide formed with a non-conducting material having suitable electro-optic properties, such as e.g. $LiNbO_3$ (lithium niobate) or the like, which enable modulating the optical phase of light guided therein substantially without substantial amplitude modulation thereof by modulating a voltage across the waveguide.

Optical PSK transmitters such as those described above may be suitable for optical communication systems that benefit from high optical launch power into an optical fiber link. Non-exclusive example of such an optical communication system is a PON, which typically lacks line optical amplifiers that can boost optical power mid-span between two network nodes.

Additionally, in some embodiment the optical transmitter and corresponding receivers may be configured to operate using a differential PSK scheme, where the input data is preprocessed such that the input bit stream encodes the phase difference between subsequent symbols in a manner similar to differential phase shift keying (DPSK) or differential quadrature phase shift keying (DQPSK), with the optical receivers implemented using one-symbol delay interferometers.

In some embodiments, the optical transmitter 100 of FIG. 1 may be the optical transmitter of an optical line terminal (OLT) of a passive optical network (PON). In such embodiments, the high and substantially constant output power of the optical transmitter 100 can provide a second function. In particular, the output power of the optical transmitter can be configured to provide backwards Raman amplification of the nearby optical channel for the upstream optical transmissions from the optical termination units (ONUs) of the PON. The inventors believe that the substantially constant power and/or anti-parallel propagation of such a phase modulated light beam from the OLT would likely not cause significant problematic crosstalk between the downstream data-modulated optical beam of the OLT and the upstream data-modulated optical light beams of the ONUs. In addition, such a configuration of the OLT to provide backwards Raman amplification might enable an increase in the maximum distance that such a PON can support for optical data communication between more remote ONUs, e.g., due to the high power of the phase modulated light beam from the OLT.

Figure 9:
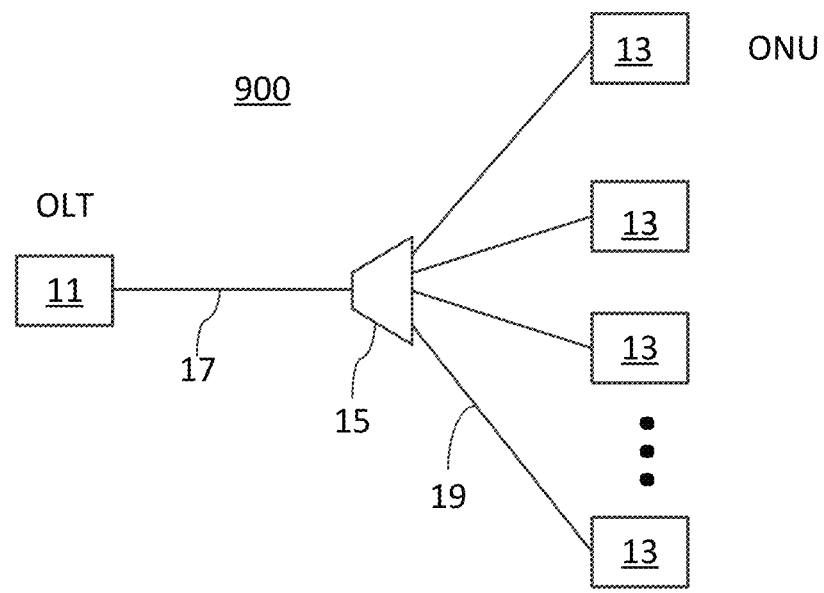
FIG. 9 is a schematic block diagram of an example passive optical network (PON), e.g., using carrier-suppressed optical PSK signals generated by the optical transmitter of FIG. 1.

FIG. 9 illustrates an example PON 900 having a star architecture, in which an optical line terminal (OLT) 11 is connected to a plurality of optical network units (ONUs) 13 at subscriber premises via a passive optical splitter 15, providing services to a plurality of subscribers. The OLT 11 may connect to the splitter 15 by a bi-directional trunk optical fiber link 17, which may be in the form of an optical fiber. The splitter 15 in turn connects to the ONUs 13 by dedicated fiber-optic links 19. In such system optical loss between the OLT 11 and each of the ONUs 13 may be high, so that a high-power optical transmitter at the ONU 13 that is less limited by non-linear distortions in the optical fiber link may be desirable.

Figure 10:
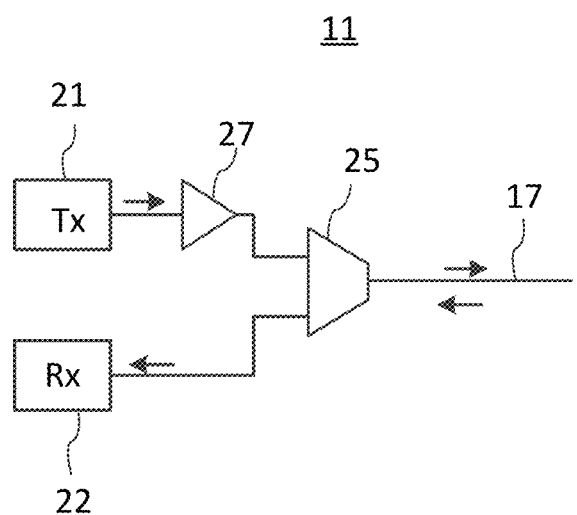
FIG. 10 is a schematic block diagram of an example optical line terminal (OLT) including an optical transmitter for transmitting carrier-suppressed optical PSK signals, e.g., the optical transmitter of FIG. 1.

Referring to FIG. 10, an example embodiment of the OLT 11 may include an optical transmitter 21 and optical receiver 22, both of each connecting to a bi-directional optical fiber link 17 via a splitter/combiner 25. In some embodiments, an optical booster amplifier 27 may be used at the output of the optical transmitter 21 to boost the optical launch power into the optical fiber link 17. The optical transmitter 21 may be embodied as a carrier-suppressed optical PSK transmitter, such as e.g. the PSK transmitter 100 embodiments of which are described above with reference to FIGS. 1-2 and 4-8. Advantageously, carrier-suppressed PSK modulated signals may have a greater SPM limit than amplitude modulated signals, thereby allowing to launch a greater optical power signal into the optical fiber link 17. Furthermore, in some embodiment the optical transmitter 21 may operate at a wavelength where the optical fiber of the fiber-optic link 17 has zero chromatic dispersion, typically in a 1.3 to 1.5 μm range, where the SPM related transmission penalty may be reduced.

The examples described above are not intended to be limiting, and many variations will become apparent to a skilled reader having the benefit of the present disclosure. For example, some embodiments may use OPMs that generate optical signals having a relatively small amplitude modulation component. In some embodiments the OPM may be configured so that the output optical signal 102 is modulated in power with a modulation depth below a specified target value. In some embodiments this specified target value may be selected to reduce, minimize, or substantially eliminate the deleterious effects of optical nonlinearities caused by variations in optical power. This target value, which can be calculated by a person skilled in the art, is dependent on the particular system parameters such as launch power, fiber type, and fiber length. By way of example, the depth of the intensity modulation at relevant modulation frequencies may be up to 2%, or up to 5%, or up to 10%, or even up to 20% in some embodiments. Furthermore, various features described above with reference to a specific embodiment or embodiments may be combined with other embodiments.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An apparatus comprising:
    an optical transmitter for transmitting an optical carrier modulated according to an M-symbol phase shift keying (M-PSK) modulation format, M≥2, the optical transmitter comprising:
        an optical phase modulator (OPM);
        a driver for driving the OPM with an electrical driver signal; and
        a signal processor for mapping an input bit stream to levels of a PAM-N constellation, where N is an integer greater than M, such that each of the levels causes the driver to produce a corresponding electrical driver signal.

2. The apparatus of claim 1 wherein the optical transmitter is configured to optically modulate the optical carrier to carry phase shifts that vary between N values spaced apart by about $2\pi/M$ radian.

3. The apparatus of claim 2 wherein the signal processor is configured to cause the electrical driver signal to vary between N different signal levels.

4. The apparatus of claim 2 wherein the optical transmitter is configured to modulate the optical carrier in power with a modulation depth smaller than 20%.

5. The apparatus of claim 2 wherein M=4 and N=6.

6. The apparatus of claim 2 wherein M=2 and N=3.

7. The apparatus of claim 3 wherein the signal processor is configured to map different instances of an input binary sequence corresponding to an M-PSK symbol to two different signal levels of the PAM-N constellation.

8. An apparatus comprising:
    an optical transmitter for transmitting an optical carrier modulated according to an M-symbol phase shift keying (M-PSK) modulation format, M≥2, the optical transmitter comprising:
        an optical phase modulator (OPM);
        a driver for driving the OPM with an electrical driver signal; and
        a signal processor for mapping an input bit stream to levels of a PAM-N constellation, where N is an integer greater than M;
        wherein the signal processor is configured to cause the electrical driver signal to vary between N signal levels corresponding to the levels of the PAM-N constellation, and to map different instances of a same input digital value to two different ones of the N signal levels; and
        wherein the two different ones of the N signal levels correspond to a same phase shift of the optical carrier modulo $2\pi$.

9. The apparatus of claim 8 wherein the signal processor is configured to map the different instances of a same input digital value to either one of the two different ones of the N signal levels in an alternating fashion.

10. The apparatus of claim 8, wherein the signal processor is configured so that transitions to the two different ones of the N signal levels from another one of the N signal levels occur with substantially equal frequency.

11. The apparatus of claim 8 wherein the signal processor is configured to use a pseudorandom selection rule to select between the two different ones of the N signal levels.

12. The apparatus of claim 5 wherein the signal processor is configured to map different occurrences in the input bit stream of a binary sequence corresponding to a first M-PSK symbol to two of the levels of the PAM-N constellation with substantially equal probability, and to map different occurrences in the input bit stream of a binary sequence corresponding to a second M-PSK symbol to two different ones of the levels of the PAM-N constellation with substantially equal probability.

13. The apparatus of claim 12 wherein the two different ones of the levels of the PAM-N constellation correspond to the OPM causing optical phase shifts differing by substantially $2\pi$ radian on the optical carrier.

14. The apparatus of claim 1 wherein the signal processor is configured to cooperate with the driver and the OPM such that at least some transitions from a binary sequence corresponding to a first M-PSK symbol to a binary sequence corresponding to a second M-PSK symbol and inverses of said transitions together cause the optical phase of the carrier to vary by substantially $2\pi$ radian.

15. An apparatus comprising:
    an optical quadrature phase shift keying (QPSK) transmitter for transmitting an optical carrier modulated according to a QPSK modulation format, the optical QPSK transmitter comprising:
        an optical phase shifter (OPS);
        a driver for driving the OPS with a PAM-6 electrical signal to cause an optical phase shift to the optical carrier that alternates between six different phase levels spaced substantially by $\pi/2$ radian, the six different phase levels comprising two pairs of $2\pi$ spaced phase levels; and
        a signal processor for processing an input bit stream to map consecutive 2-bit sequences therein to symbols of a QPSK constellation, so that a first and a second of the symbols are each mapped to both phase levels of a corresponding pair of the $2\pi$ spaced phase levels.

16. The apparatus of claim 15, wherein the signal processor is configured so that transitions from a third of the symbols to the first of the symbols in the input bit stream are represented by transitions to different phase levels of a first of the two pairs, and transitions from the third of the symbols to the second of the symbols in the input bit stream are represented by transitions to different phase levels of a second of the two pairs.

17. The apparatus of claim 16, wherein the signal processor is configured so that transitions to different phase levels of a first or second of the two pairs happen with a substantially same frequency.

18. The apparatus of claim 15, further comprising a passive optical network including an optical line terminal, the optical transmitter being configured to provide downstream optical data transmission from the optical line terminal and to provide Raman optical amplification of upstream optical transmissions from optical network units of the passive optical network.

19. The apparatus of claim 18 wherein the optical transmitter is configured to modulate the optical carrier in power with a modulation depth smaller than 20%.

20. The apparatus of claim 18, wherein the signal processor is configured to cause the electrical driver signal to vary between N different levels; and wherein the signal processor is configured to map different instances of an input digital value, in the input bit stream, to two different signal levels of a PAM-N constellation.

\* \* \* \* \*